United States Patent
Zhang et al.

(10) Patent No.: US 10,903,987 B2
(45) Date of Patent: Jan. 26, 2021

(54) KEY CONFIGURATION METHOD, KEY MANAGEMENT CENTER, AND NETWORK ELEMENT

(71) Applicant: Huawei Technologies Co., Ltd., Guangdong (CN)

(72) Inventors: Bo Zhang, Shenzhen (CN); Lu Gan, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 323 days.

(21) Appl. No.: 15/978,794

(22) Filed: May 14, 2018

(65) Prior Publication Data
US 2018/0278595 A1    Sep. 27, 2018

Related U.S. Application Data

(63) Continuation of application No. PCT/CN2016/109040, filed on Dec. 8, 2016.

(30) Foreign Application Priority Data

Dec. 31, 2015  (CN) .......................... 2015 1 1030585

(51) Int. Cl.
*H04L 9/08* (2006.01)
*H04W 12/04* (2009.01)
(Continued)

(52) U.S. Cl.
CPC .......... *H04L 9/0822* (2013.01); *H04L 9/0618* (2013.01); *H04L 9/083* (2013.01);
(Continued)

(58) Field of Classification Search
CPC .................................................. H04L 63/062
See application file for complete search history.

(56) References Cited

U.S. PATENT DOCUMENTS

| 10,469,464 B2* | 11/2019 | Smith | H04L 9/0841 |
| 2005/0188202 A1* | 8/2005 | Popp | H04L 9/3263 |
| | | | 713/175 |

(Continued)

FOREIGN PATENT DOCUMENTS

| CN | 1929369 A | 3/2007 |
| CN | 1961523 A | 5/2007 |

(Continued)

OTHER PUBLICATIONS

"3GPP TS 33.210 V13.0.0 3rd Generation Partnership Project;Technical Specification Group Services and System Aspects;3G security; Network Domain Security (NDS); IP network layer security(Release 13), Technical Specification, Dec. 2015, 24 pages".

(Continued)

*Primary Examiner* — Ponnoreay Pich
(74) *Attorney, Agent, or Firm* — Womble Bond Dickinson (US) LLP

(57) ABSTRACT

This application provides a key configuration method and an apparatus. A key management center obtains a service key, and performs encryption and/or integrity protection on the service key to obtain a token. The key management center sends the token to a first network element, the first network element forwards the token to a second network element, and the second network element obtains the service key based on the token. The service key is used to perform encryption and/or integrity protection on data transmitted between the first network element and the second network element. Therefore, security key configuration can be implemented through interaction between the key management center and the network elements, thereby laying a foundation for end-to-end security communication between the first network element and the second network element.

18 Claims, 8 Drawing Sheets

(51) Int. Cl.
  *H04L 9/06* (2006.01)
  *H04L 9/32* (2006.01)
  *H04L 29/06* (2006.01)

(52) U.S. Cl.
  CPC .......... *H04L 9/3213* (2013.01); *H04L 63/062* (2013.01); *H04W 12/0401* (2019.01); *H04W 12/04071* (2019.01); *H04L 2209/80* (2013.01)

(56) References Cited

U.S. PATENT DOCUMENTS

| | | | | |
|---|---|---|---|---|
| 2007/0058815 | A1* | 3/2007 | Kwak | H04L 9/0841 380/286 |
| 2010/0017601 | A1* | 1/2010 | Falk | H04W 12/04 713/168 |
| 2011/0138183 | A1* | 6/2011 | Reddy | H04L 9/3066 713/169 |
| 2013/0182843 | A1* | 7/2013 | Buckley | H04L 63/306 380/255 |
| 2014/0019753 | A1 | 1/2014 | Lowry et al. | |
| 2018/0270210 | A1* | 9/2018 | Gan | H04L 63/1475 |
| 2018/0278595 | A1* | 9/2018 | Zhang | H04L 9/3213 |

FOREIGN PATENT DOCUMENTS

| | | |
|---|---|---|
| CN | 102891753 A | 1/2013 |
| CN | 104683304 A | 6/2015 |
| EP | 2768178 A1 | 8/2014 |

OTHER PUBLICATIONS

"3GPP TS 33.401 V13.1.0 3rd Generation Partnership Project;Technical Specification Group Services and System Aspects;3GPP System Architecture Evolution (SAE);Security architecture(Release 13), Technical Specification, Dec. 2015, 135 pages".

XP055159502 RFC6043 J. Mattsson et al.,"MIKEY-Ticket: Ticket-Based Modes of Key Distribution in Multimedia Internet KEYing (MIKEY)",Internet Engineering Task Force (IETF),dated Mar. 2011,total 58 pages.

* cited by examiner

KEY CONFIGURATION METHOD, KEY MANAGEMENT CENTER, AND NETWORK ELEMENT

CROSS-REFERENCE TO RELATED APPLICATIONS

This application is a continuation of International Application No. PCT/CN2016/109040, filed on Dec. 8, 2016, which claims priority to Chinese Patent Application No. 201511030585.2, filed on Dec. 31, 2015. The disclosures of the aforementioned applications are hereby incorporated by reference in their entireties.

TECHNICAL FIELD

This application relates to the communications field, and in particular, to a key configuration method, a key management center, and a network element.

BACKGROUND

In an existing mobile communications security architecture, security protection of data from a terminal to a network is performed in a segment encryption manner. For example, in a process in which user equipment sends data to another user equipment, transmit-end user equipment sends encrypted data to a first base station, and the first base station first decrypts the data and then re-encrypts data, and sends re-encrypted data to another intermediate device. Finally, the data is sent to receive-end user equipment.

With the segment encryption manner, because communication data is decrypted on the intermediate device, a risk of being stolen is increased. Therefore, end-to-end security communication becomes a development trend of security communication. The end-to-end security communication means that a transmit-end device and a receive-end device establish a secure tunnel, and an intermediate node on the secure tunnel only forwards ciphertext data and does not decrypt encrypted data.

In addition, security key configuration for two network elements that participate in end-to-end communication needs to be implemented before they perform end-to-end security communication.

SUMMARY

This application provides a key configuration method, an apparatus, and a network element, and intends to resolve a problem about how to perform security key configuration for the network element.

To achieve the foregoing objective, this application provides the following technical solutions.

A first aspect of this application provides a key configuration method, including: obtaining, by a key management center, a service key, where the service key is used to perform encryption and/or integrity protection on data transmitted between a first network element and a second network element; obtaining, by the key management center, a token, where the token is a result of performing encryption and/or integrity protection on the service key; and sending, by the key management center, the token, where the token is obtained and forwarded by the first network element to the second network element, so that the second network element obtains the service key based on the token. According to the key configuration method described in this application, the key management center obtains the service key and the token. After receiving the service key and the token, the first network element sends the token to the second network element. Because the token is the result of performing encryption and/or integrity protection on the service key, the second network element may obtain the service key based on the token. In addition, because the service key is used to perform encryption and/or integrity protection on the data transmitted between the first network element and the second network element, security key configuration can be implemented through interaction between the key management center and the network elements, thereby laying a foundation for end-to-end security communication between the first network element and the second network element.

A second aspect of this application provides another key configuration method, including: obtaining, by a first network element, a service key and a token, where the service key is used to perform encryption and/or integrity protection on data transmitted between the first network element and a second network element, and the token is a result of performing encryption and/or integrity protection on the service key; and sending, by the first network element, the token to the second network element, where the token is used by the second network element to obtain the service key. Because the first network element sends the token to the second network element, the second network element may obtain the service key from the token, so that the first network element and the second network element can perform end-to-end security communication.

A third aspect of this application provides another key configuration method, including: receiving, by a network control center, a key request, where the key request carries an identifier of a first network element and an identifier of a second network element; if the identifier of the first network element and/or the identifier of the second network element are/is not permanent identifiers/a permanent identifier, replacing, by the network control center, the identifier of the first network element with a permanent identifier of the first network element, and/or replacing the identifier of the second network element with a permanent identifier of the second network element; and sending, by the network control center, a second key request message to a key management center, where the second key request message includes the permanent identifier of the first network element and the permanent identifier of the second network element; and the key management center is configured to generate a service key and a token based on the permanent identifier of the first network element and the permanent identifier of the second network element that are in the key request, where the token is a result of performing encryption and/or integrity protection on the service key, and the service key is used to perform encryption and/or integrity protection on data transmitted between the first network element and the second network element.

A fourth aspect of this application provides another key configuration method, including: receiving, by a key management center, a key request, where the key request carries at least one of an identifier of a first network element, an identifier of a second network element, or a service parameter, and the key request is sent to the key management center by the first network element, the second network element, a network control center, or a service server; generating, by the key management center, a service key based on at least one of the identifier of the first network element, the identifier of the second network element, or the service parameter, where the service key is used to perform encryption and/or integrity protection on data transmitted between the first network element and the second network element; using, by the key management center, a shared key between the key management center and the second network element to encrypt a character string including the service key and the first-type key parameter to obtain a token, where the first-type key parameter is a message authentication code that is of the service key and that is calculated by the key management center by using the shared key or a message authentication code that is of a character string including the service key and information about the service key and that is calculated by the key management center by using the shared key, where the information about the service key includes any one of the following items: a usage entity identifier of the service key, a validity period of the service key, a generation time of the service key, and information about a service that uses the service key and service link information; and sending, by the key management center, the token, where the token is obtained and forwarded by the first network element to the second network element, so that the second network element obtains the service key based on the token.

A fifth aspect of this application provides another key configuration method, including: receiving, by a key management center, a key request sent by a first network element to generate a service key, and sending the service key to the first network element and a second network element, where the service key is used to perform encryption and/or integrity protection on data transmitted between the first network element and the second network element.

A sixth aspect of this application provides a key management center, including: a first processor and a first memory. The first memory is configured to store an operating system, an application program, and data generated during running of the application program; and the first processor is configured to implement the following functions by running the application program stored in the first memory: obtaining a service key, where the service key is used to perform encryption and/or integrity protection on data transmitted between a first network element and a second network element; obtaining a token, where the token is a result of performing encryption and/or integrity protection on the service key; and sending the token, where the token is obtained and forwarded by the first network element to the second network element, so that the second network element obtains the service key based on the token.

A seventh aspect of this application provides a network element, including: a second processor and a second memory. The second memory is configured to store an operating system, an application program, and data generated during running of the application program; and the second processor is configured to implement the following functions by running the application program stored in the second memory: obtaining a service key and a token, where the service key is used to perform encryption and/or integrity protection on data transmitted between the first network element and another network element, and the token is a result of performing encryption and/or integrity protection on the service key; and sending the token to the another network element, where the token is used by the another network element to obtain the service key.

An eighth aspect of this application provides a network control center, including: a third processor and a third memory. The third memory is configured to store an operating system, an application program, and data generated during running of the application program; and the third processor is configured to implement the following functions by running the application program stored in the third memory: receiving a key request, where the key request carries an identifier of a first network element and an identifier of a second network element; if the identifier of the first network element and/or the identifier of the second network element are/is not permanent identifiers/a permanent identifier, replacing the identifier of the first network element with a permanent identifier of the first network element, and/or replacing the identifier of the second network element with a permanent identifier of the second network element; and sending a second key request message to a key management center, where the second key request message includes the permanent identifier of the first network element and the permanent identifier of the second network element; and the key management center is configured to generate a service key and a token based on the permanent identifier of the first network element and the permanent identifier of the second network element that are in the key request, where the token is a result of performing encryption and/or integrity protection on the service key, and the service key is used to perform encryption and/or integrity protection on data transmitted between the first network element and the second network element.

A ninth aspect of this application provides another key management center, including: a fourth processor and a fourth memory. The fourth memory is configured to store an operating system, an application program, and data generated during running of the application program; and the fourth processor is configured to implement the following functions by running the application program stored in the fourth memory: receiving a key request, where the key request carries at least one of an identifier of a first network element, an identifier of a second network element, or a service parameter, and the key request is sent by the first network element, the second network element, a network control center, or a service server; obtaining a service key, where the service key is used to perform encryption and/or integrity protection on data transmitted between the first network element and the second network element; using a shared key between the key management center and the second network element to encrypt a character string including the service key and the first-type key parameter to obtain a token, where the first-type key parameter is a message authentication code that is of the service key and that is calculated by the key management center by using the shared key or a message authentication code that is of a character string including the service key and information about the service key and that is calculated by the key management center by using the shared key, where the information about the service key includes any one of the following items: a usage entity identifier of the service key, a validity period of the service key, a generation time of the service key, and information about a service that uses the service key and service link information; and sending the token, where the token is obtained and forwarded by the first network element to the second network element, so that the second network element obtains the service key based on the token.

In some embodiments, obtaining the token includes: obtaining the first-type key parameter based on the service key, where the first-type key parameter includes a message authentication code or a digital signature obtained from the service key; and using a first parameter to encrypt a character string including the service key and the first-type key parameter to obtain the token, where the first parameter includes a shared key between the key management center and the second network element, a public key of the second network element, or the identifier of the second network element.

In some embodiments, obtaining the first-type key parameter based on the service key includes: using the shared key to calculate a message authentication code of the service key; or, using the shared key to calculate a message authentication code of a character string including the service key and information about the service key; or, using a preset private key to calculate a digital signature of the service key; or, using a preset private key to calculate a digital signature of a character string including the service key and information about the service key, where the information about the service key includes any one of the following items: a usage entity identifier of the service key, a validity period of the service key, a generation time of the service key, and information about a service that uses the service key and service link information.

In some embodiments, obtaining the token includes: receiving a token sent by another key management center.

In some embodiments, sending the token includes: sending the token to the first network element; and the fourth processor is further configured to send the service key to the first network element.

In some embodiments, a specific process of sending the service key and the token to the first network element includes: using a second parameter to encrypt a character string to form a ciphertext, and sending the ciphertext to the first network element, where the character string includes the service key, the token, and a second-type key parameter; or using a second parameter to encrypt a character string to form a ciphertext, and sending the ciphertext and the token to the first network element, where the character string includes the service key and a second-type key parameter, the second-type key parameter includes a message authentication code or a digital signature obtained from a character string including the service key and the token, and the second parameter includes a shared key between the key management center and the first network element, a public key of the first network element, or the identifier of the first network element.

In some embodiments, the second-type key parameter in the character string is a message authentication code, and the message authentication code is obtained by using the shared key between the key management center and the first network element to perform integrity protection on the character string including the service key and the token; or, the second-type key parameter in the character string is a digital signature, and the digital signature is obtained by using a preset private key to perform a digital signature operation on the character string including the service key and the token.

In some embodiments, a specific process of sending the service key and the token to the first network element includes: sending the service key and the token to the first network element by using a pre-established secure channel between the key management center and the first network element.

In some embodiments, sending the token includes: sending the token to another key management center.

In some embodiments, obtaining the service key includes: generating the service key K according to any one of the following rules: K=KDF(Key, (time, at least one of preset parameters)), where KDF refers to a key derivation function, and Key is one of or a combination of a plurality of: a random number selected by the key management center, the shared key K1 between the first network element and the key management center, the shared key K2 between the second network element and the key management center, a random number selected by another key management center, or a shared key between the another key management center and the second network element; time is a deadline, validity period duration, or a current system time of the service key K; the preset parameters include the identifier of the first network element, the identifier of the second network element, the service parameter, and an SN; the service parameter is at least one of a sequence number in the service, a related time of the service key, a related ID in the service, a fresh parameter (Fresh parameter), or a random number (nonce/random number); and the SN is a sequence number used for calculating the service key.

In some embodiments, obtaining the service key includes: sending a first negotiation parameter to another key management center, where the first negotiation parameter is at least one of a random number 1, a system time 1, a sequence number 1, or a fresh parameter fresh parameter 1; receiving a second negotiation parameter sent by the another key management center, where the second negotiation parameter is at least one of a random number 2, a system time 2, a sequence number 2, or a fresh parameter fresh parameter 2; and generating the service key according to a rule KDF(first negotiation parameter, second negotiation parameter), or generating, by the key management center, the service key according to a rule K=KDF(Key, (time, at least one of preset parameters)); where Key is a reference service key or a key obtained from a Diffie-Hellman (DH) key exchange method, and the reference service key is generated according to KDF(first negotiation parameter, second negotiation parameter); time is a deadline, validity period duration, or a current system time of the service key K; and the preset parameters include the identifier of the first network element, the identifier of the second network element, the service parameter, and an SN; the service parameter is at least one of a sequence number in the service, a related time of the service key, a related ID in the service, a fresh parameter (Fresh parameter), or a random number (nonce/random number); and the SN is a sequence number used for calculating the service key.

In some embodiments, obtaining the service key includes: sending a first parameter $g^x$ in a DH key exchange method to another key management center; receiving a second parameter $g^y$ that is in the DH key exchange method and that is sent by the another key management center; and calculating, by the key management center, $g^{xy}$, and using $g^{xy}$, KDF($g^{xy}$), or K=KDF($g^{xy}$, (time, at least one of preset parameters)) as the service key, where Key is a reference service key or a key obtained from a DH key exchange method, and the reference service key is generated according to KDF (first negotiation parameter, second negotiation parameter); time is a deadline, validity period duration, or a current system time of the service key K; the preset parameters include the identifier of the first network element, the identifier of the second network element, the service parameter, and an SN; the service parameter is at least one of a sequence number in the service, a related time of the service key, a related ID in the service, a fresh parameter (Fresh parameter), or a random number (nonce/random number); and the SN is a sequence number used for calculating the service key.

In some embodiments, obtaining the service key includes: receiving a service key sent by another key management center.

In some embodiments, the functions further include: receiving a key request, where the key request carries at least one of the identifier of the first network element, the identifier of the second network element, or the service parameter, and the key request is sent by the first network element, the second network element, the network control center, or the service server.

In some embodiments, the functions further include: receiving a first key request sent by the network control center, where the first key request carries a permanent identifier of the first network element and a permanent identifier of the second network element, the permanent identifier of the first network element is obtained by the network control center by converting a temporary identifier of the first network element, the permanent identifier of the second network element is obtained by the network control center by converting a temporary identifier of the second network element, and the temporary identifier of the first network element and the temporary identifier of the second network element are carried in a second key request that is sent to the network control center by the first network element, the second network element, or the service server.

BRIEF DESCRIPTION OF DRAWINGS

To describe the technical solutions in the embodiments of this disclosure more clearly, the following briefly describes the accompanying drawings required for describing the embodiments. Apparently, the accompanying drawings in the following description show some embodiments of this application, and a person of ordinary skill in the art may still derive other drawings from these accompanying drawings without creative efforts.

DESCRIPTION OF EMBODIMENTS

Figure 1:
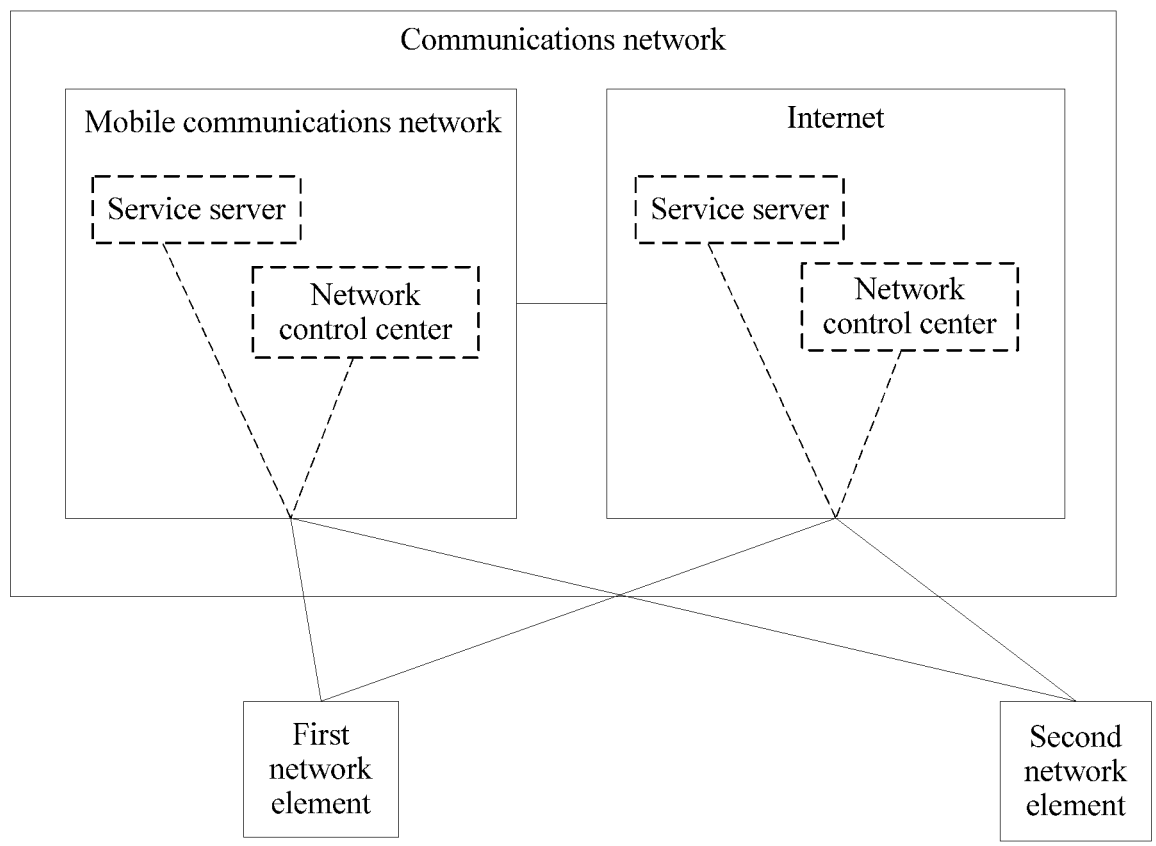
FIG. 1 is a schematic diagram of a scenario in which two network elements perform end-to-end communication by using a communications network.

FIG. 1 shows a scenario in which two network elements perform end-to-end communication by using a communications network. The network element may be a communication participant such as user equipment (UE), a server, or a controller, or may be an intermediate device such as a gateway. The communications network may be a mobile communications network, for example, a wireless communications network such as Global System for Mobile Communications (GSM), Wideband Code Division Multiple Access (WCDMA), 3GPP Long Term Evolution (LTE), future 5G, or Wireless Fidelity (WiFi) (also referred to as the 802.11b standard in one embodiment); or may be the Internet.

In one embodiment, the two network elements perform end-to-end communication by using the mobile communications network that may include any one of the following cases: The two network elements complete end-to-end communication by using the mobile communications network, the two network elements complete end-to-end communication by using the Internet, or the two network elements complete end-to-end communication by using the mobile communications network and the Internet. In one embodiment, the communications network may include a service server and a network control center. The two network elements may implement information exchange with the communications network by using the service server and/or the network control center.

To implement end-to-end security communication between the two network elements, a service key may be used to perform encryption and/or integrity protection on data transmitted between the two network elements, and service key configuration for the network elements is a basis for achieving this objective.

Figure 2:
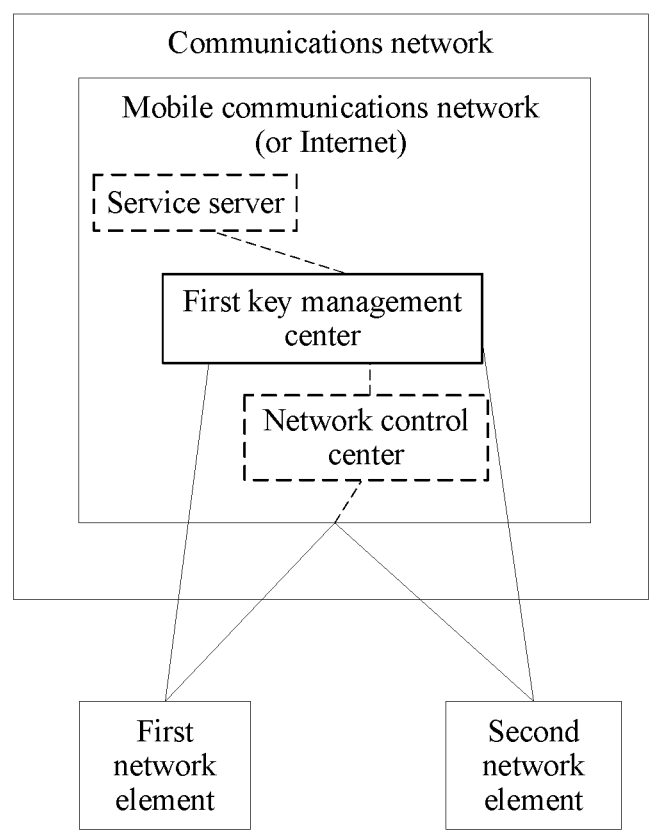
FIG. 2 is a schematic diagram of deployment of a key management center.

To achieve the foregoing objective, a key management center is disposed in a communications network, and is responsible for configuring a service key for a network element. As shown in FIG. 2, specifically, one key management center may be disposed in one type of network, and the key management center is responsible for configuring a service key for two network elements; or one key management center may be disposed in each of different types of networks, and each key management center is responsible for configuring a service key for one network element. For example, as shown in FIG. 3, a first key management center is disposed in a mobile communications network, and is responsible for configuring a service key for a first network element in the mobile communications network; and a second key management center is disposed in the Internet, and is responsible for configuring a service key for a second network element in the Internet.

This embodiment mainly describes how the key management center configures the service key for the network element.

Figure 3:
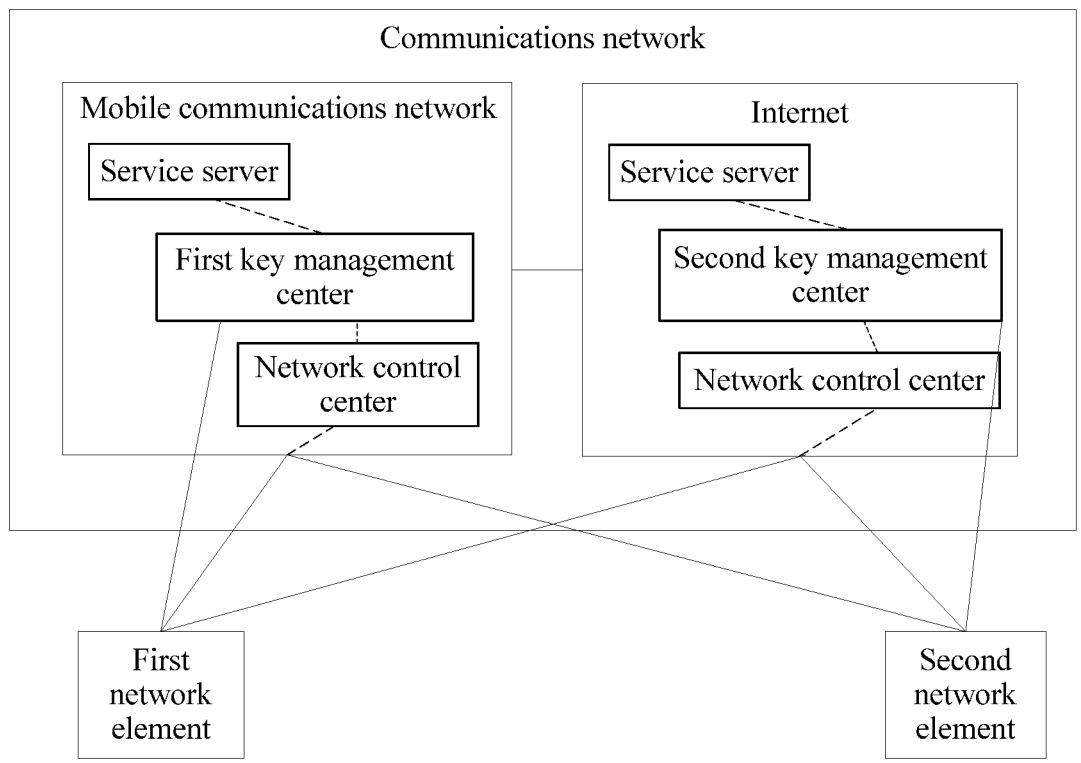
FIG. 3 is a schematic diagram of another deployment of a key management center.
Figure 4:
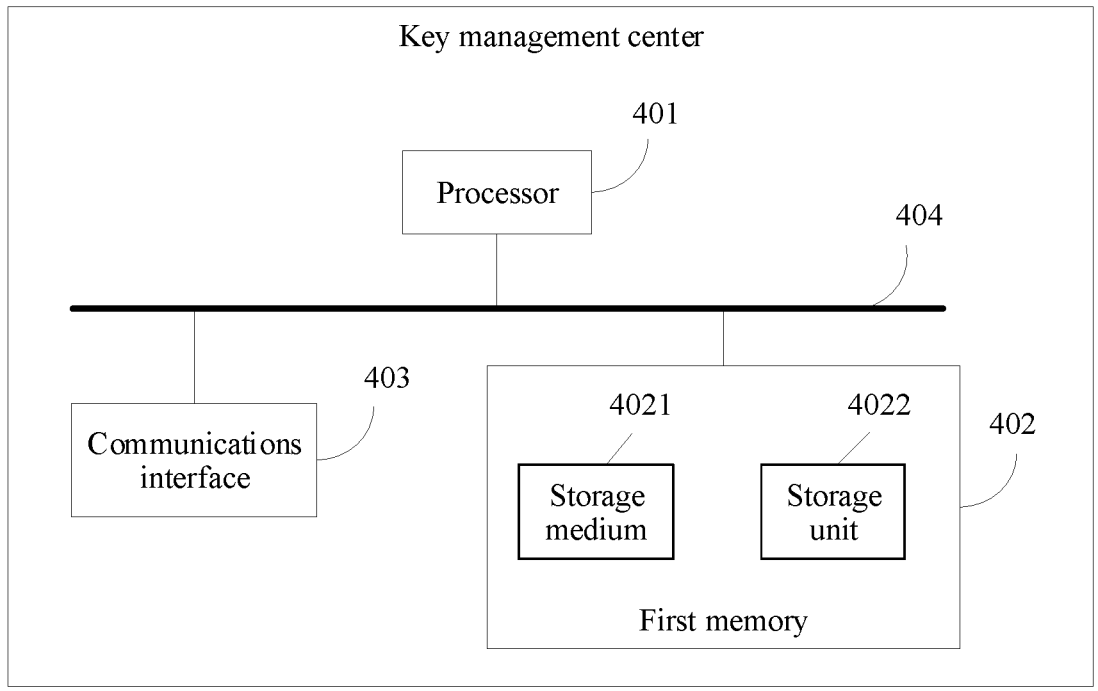
FIG. 4 is a schematic structural diagram of a key management center according to one embodiment.

A structure of the key management center, as shown in FIG. 2 or FIG. 3, is shown in FIG. 4, and includes: a first processor 401, and a first memory 402 and a communications interface 403 that are used cooperatively with the first processor 401. The foregoing components communicate with each other by using a bus 404.

The first memory 402 includes a storage medium 4021 and a storage unit 4022. In one embodiment, the storage medium may be a read-only memory (ROM), a hard disk, or a flash memory. In one embodiment, the storage unit 4022 may be a random access memory (RAM).

The first memory 402 stores an operating system, an application program, and data generated during running of the application program. In this embodiment, an application program that implements a key configuration function is included. The first processor 401 implements, for example by invoking and running the application program, a function of configuring a service key for a network element. Data generated when the first processor runs the program is also stored in the storage unit.

The following describes in detail how the key management center in FIG. 4 implements the function of configuring a key for the network element.

Figure 5:
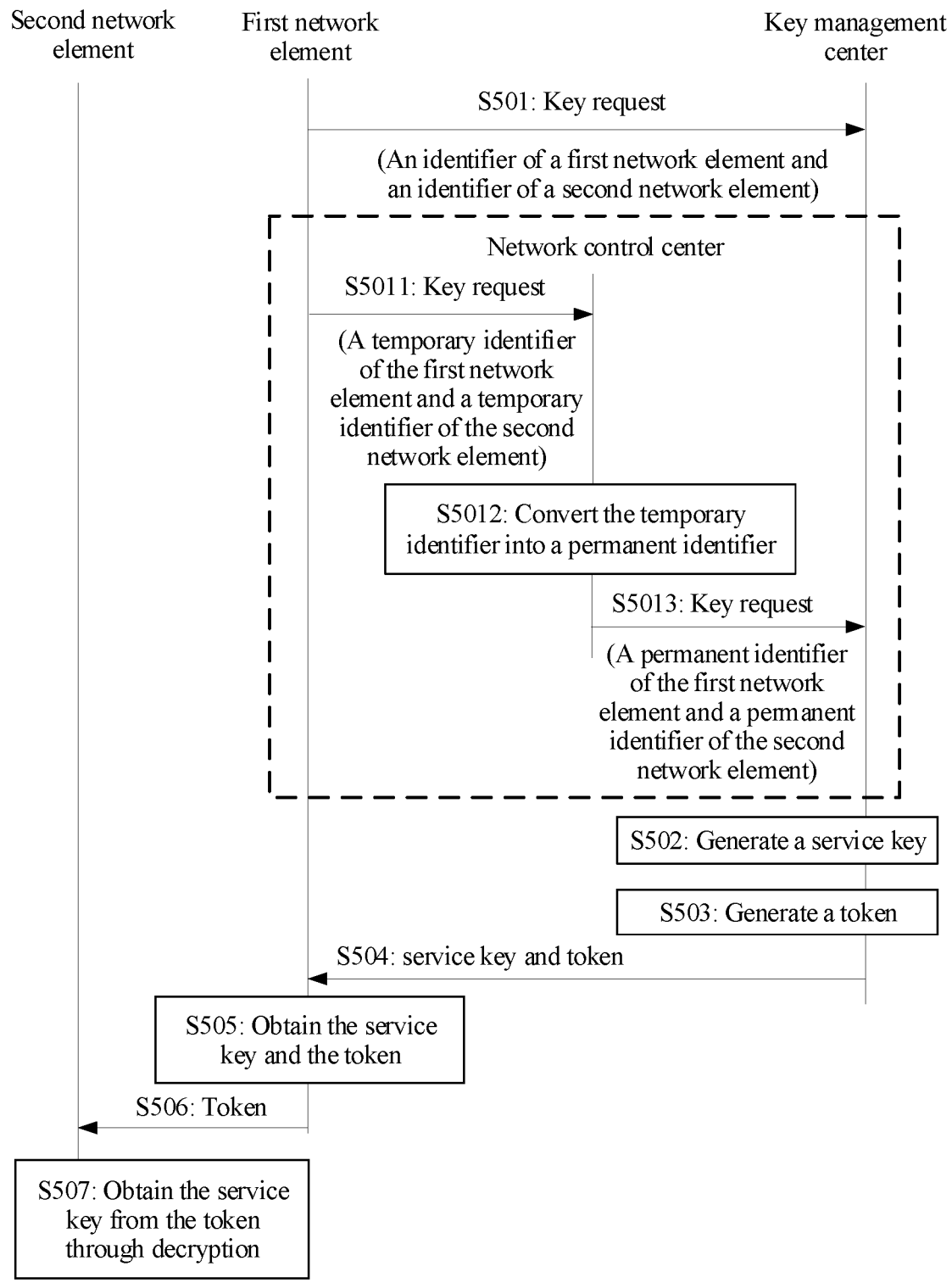
FIG. 5 is a flowchart of a key configuration method according to one embodiment.

As shown in FIG. 5, in the scenario in which only one key management center is included and that is shown in FIG. 2, a specific process of configuring a service key for two network elements includes the following steps.

At S501, the key management center receives a key request, and the key request carries at least one of an identifier of a first network element, an identifier of a second network element, or a service parameter of a service.

There may be various service parameters of the service. For example, the service parameter of the service may include at least one of a sequence number (SN) in the service, a related time of the service key, a related ID in the service, a fresh parameter, or a random number (nonce/random number). The related ID in the service may include at least one of an ID of the key management center, a service ID, a session ID, a network ID, a link ID, an application app ID, a server ID, or a public land mobile network (PLMN) ID. The related time of the service key may include at least one of a start time, an end time, or a validity period of the service.

Each of the identifier of the first network element and the identifier of the second network element may include at least one of an IMEI, an IMSI, an IMPI, a TMSI, an IMPU, an app ID, a network ID, a MAC address, an IP address, a mobile number, or a GUTI. This is not limited herein.

In one embodiment, the key request may be sent to the key management center by the first network element, the second network element, or a service server.

In addition, the key request may alternatively be sent to a network control center by the first network element, the second network element, or a service server, and then be forwarded to the key management center by the network control center. Specifically, the following steps are included.

At S5011, the network control center receives the key request that carries at least one of the identifier of the first network element, the identifier of the second network element, or the service parameter.

At S5012, if the identifier of the first network element is a temporary identifier, the network control center converts the temporary identifier of the first network element into a permanent identifier of the first network element; and if the identifier of the second network element is a temporary identifier, the network control center converts the temporary identifier of the second network element into a permanent identifier of the second network element. In one embodiment, the network control center may pre-store a correspondence between a temporary identifier and a permanent identifier that are of each network element. The network control center may implement conversion between the temporary identifier and the permanent identifier by querying the correspondence. For example, the temporary identifier may be an IMPU, a GUTI, or a TMSI; and the permanent identifier may be an IMSI, an IMEI, an IMPI, an app ID, a network ID, a MAC address, an IP address, or a mobile number. This is not limited herein.

At S5013, the network control center sends, to the key management center, the key request that carries at least one of the permanent identifier of the first network element, the permanent identifier of the second network element, or the service parameter.

It should be noted that the first network element may send a message verification code when sending the key request. The verification code is used by the key management center to verify validity of the key request, so as to prevent a key request maliciously sent by an attacker. The first network element may calculate the message verification code based on a shared key K1 between the first network element and the key management center or based on a private key of the first network element.

In one embodiment, S5011 to S5013 may be optional steps.

At S502, after receiving the key request, the key management center generates a service key K according to any one of the following rules.

Specifically, the rule is as follows:

K=KDF(Key, (time, at least one of preset parameters)). Key may be one of or a combination of a plurality of: a random number, the shared key K1 between the first network element and the key management center, or a shared key K2 between the second network element and the key management center; and time is a deadline, validity period duration, or a current system time of the service key K.

The preset parameters include the identifier of the first network element, the identifier of the second network element, the service parameter, and the SN; the service parameter is at least one of the sequence number in the service, the related time of the service key, the related ID in the service, the fresh parameter (Fresh parameter), or the random number (nonce/random number); and the SN is a sequence number used for calculating the service key.

Further, the related ID in the service is one of or a combination of a plurality of: the ID of the first network element, the ID of the second network element, the identifier of the key management center, the service ID, the session ID, the network ID, the link ID, the app ID, the server ID, the PLMN ID, the mobile number, or a function device ID; and time is the deadline, the validity period duration, or a current system start time of the service key K. The SN is a sequence number used for calculating the service key. The ID of the first network element and the ID of the second network element may be at least one of the IMEI, the IMSI, the IMPI, the TMSI, the IMPU, the app ID, the network ID, the MAC address, the IP address, the mobile number, or the GUTI. KDF represents a key derivation function.

In addition to the rule, the key management center may further randomly generate a character string as the service key.

At S503, the key management center generates a token.

In one embodiment, the key management center may generate the token in any one of the following manners:

Manner 1: The key management center uses the shared key K2 between the key management center and the second network element to calculate a message authentication code MAC_K2_(K) of the service key K, and uses the shared key K2 between the key management center and the second network element, a public key PK2 of the second network element, or the identifier ID2 of the second network element to encrypt a character string including the service key K and the message authentication code MAC_K2_(K) to obtain the token.

For example, K2 is used, that is, Token=En_K2_(K∥MAC_K2_(K)). K∥MAC_K2_(K) represents the character string including concatenated K and MAC_K2_(K), and En_K2 represents encryption of K∥MAC_K2_(K) by using K2. K and MAC_K2_(K) may be combined in the concatenation manner, or in another character string combination manner, for example, two character strings are connected in series by using a specific identifier such as 1111, a comma, or a separator. The processing manner does not mean that encrypted content includes only K and MAC_K2_(K). The encrypted content may further include another character string such as the nonce or the fresh parameter. The combination manner is also applicable to the following description related to character string concatenation, and is also applicable when character strings processed in a signature, MAC, encryption, and hash need to be combined together.

Manner 2: The key management center uses K2 to calculate a message authentication code MAC_K2_(K∥indication) of a character string including the service key K and information about the service key: indication, and uses K2, PK2, or ID2 to encrypt a character string including the service key K and the message authentication code MAC_K2_(K∥indication) to obtain the token token, where indication includes at least one of the following parameters: a usage entity identifier of the service key, a validity period of the service key, a generation time of the service key, information about a service that uses the service key and service link information, or the service parameter of the service; and indication may also be carried in the key request in S501.

For example, PK2 is used, that is, Token=En_PK2 (K∥MAC_K2_(K∥indication)). K∥MAC_K2_(K∥indication) represents a character string including concatenated K and MAC_K2_(K∥indication), and En_PK2 represents encryption of K∥MAC_K2_(K∥indication) by using PK2.

Manner 3: The key management center uses a preset private key SK_KMS to calculate a digital signature of the service key K, and uses K2, PK2, or ID2 to encrypt the digital signature of the service key K to obtain the token token.

For example, ID2 is used. Token=En ID2 (K∥Signature_SK_KMS_(K)). Signature_SK_KMS_(K) is the digital signature that is of K and that is obtained by using SK_KMS, K∥Signature_SK_KMS_(K) is a character string including K and Signature_SK_KMS_(K), and En ID2 represents encryption of the character string including K and Signature_SK_KMS_(K) by using ID2.

Manner 4: The key management center uses a preset private key SK_KMS to calculate a digital signature of a character string including the service key K and indication, and uses K2, PK2, or ID2 to encrypt the digital signature of the character string including K and indication to obtain the token token.

For example, PK2 is used, that is, Token=En_PK2_ (K∥Signature_SK_KMS_(K∥indication)).

At S504, the key management center sends the service key and the token to the first network element.

In one embodiment, the service key and the token may be sent in any one of the following manners:

Manner 1: The key management center uses the shared key K1 between the key management center and the first network element to perform integrity protection on a character string including the service key K and the token token to obtain a message authentication code MAC_K1_(K∥token); uses K1, a public key PK1 of the first network element, or the identifier ID1 of the first network element to encrypt a character string K∥Token∥MAC_K1_(K∥token) including the service key K, the token token, and the message authentication code MAC_K1_(K∥token) to form a ciphertext, that is, Ciphertext=En_K1_(K∥Token∥MAC_K1_(K∥token)); and sends the ciphertext to the first network element.

Manner 2: The key management center uses a preset private key SK to calculate a digital signature Signature_SK_KMS_(K∥token) of a character string including the service key K and the token token; uses K1, PK1, or ID1 to encrypt a character string K∥Token∥Signature_SK_KMS_ (K∥token) including the service key K, the token token, and the digital signature Signature_SK_KMS_(K∥token) to form a ciphertext, for example, K1 is used, that is, Ciphertext=En_K1_(K∥Token∥Signature_SK_KMS_(K∥token)); and sends the ciphertext to the first network element.

Manner 3: The key management center uses K1 to perform integrity protection on a character string including the service key K and the token token to obtain a message authentication code MAC_K1_(K∥token); uses K1, PK1, or ID1 to encrypt a character string MAC_K1_(K∥token) including the service key K and the message authentication code MAC_K1_(K∥token) to form a ciphertext, for example, PK1 is used, that is, Ciphertext=En_PK_(K∥MAC_K1_ (K∥token)); and sends the ciphertext and the token to the first network element because the ciphertext does not include the token.

Manner 4: The key management center uses a preset private key SK to calculate a digital signature Signature_SK_KMS_(K∥token) of a character string including the service key K and the token token; uses K1, PK1, or ID1 to encrypt a character string K Signature_SK_KMS_(K∥token) including the service key K and the digital signature Signature_SK_KMS_(K∥token) to form a ciphertext, for example, K1 is used, that is, Ciphertext=En_K1_(K∥Signature_SK_KMS_(K∥token)); and sends the ciphertext and the token to the first network element.

Manner 5: The key management center sends the service key and the token to the first network element by using a pre-established secure channel between the key management center and the first network element. Because the service key and the token are sent through the secure channel, the service key and the token may be directly sent without being encrypted.

It should be noted that the listed manners of generating the token may be randomly combined, and the listed manners of sending the token and the service key may be randomly combined.

At S505, depending on different sending manners, the first network element may receive a ciphertext, may receive a ciphertext and the token, or may receive a plaintext of the service key and the token.

After receiving the ciphertext, the first network element obtains the service key and the token through decryption, and performs integrity verification on the service key and the token.

At S506, the first network element sends the token to the second network element.

At S507, the second network element obtains the service key from the token through decryption, and performs integrity verification on the service key.

It can be learned from the process in this embodiment that the key management center generates the service key and the token for data transmission between the first network element and the second network element and sends the service key and the token to the first network element, then the first network element sends the token to the second network element, and the second network element obtains the service key from the token through decryption. Therefore, an objective of distributing the service key to the network elements by the key management center can be achieved, thereby laying a foundation for end-to-end security communication between two network elements.

It should be noted that in this embodiment, the process shown in FIG. 5 is triggered when the key management center receives the key request. In addition, the key management center may actively start S502 and subsequent steps by itself. In one embodiment, S501, S5011, and S5012 may be optional steps.

Figure 6:
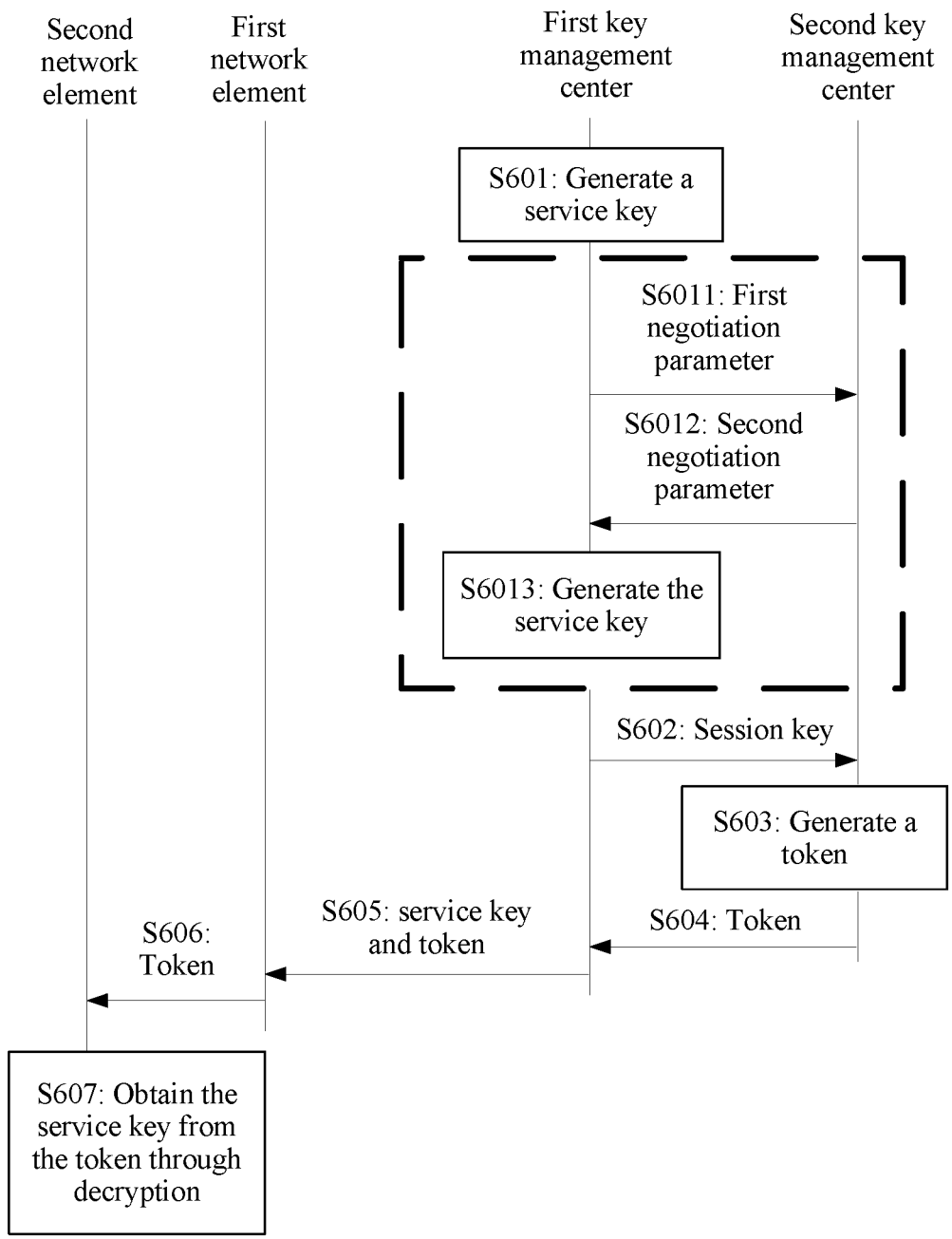
FIG. 6 is a flowchart of another key configuration method according to one embodiment.

In addition to the scenario shown in FIG. 2, in the scenario in which two key management centers exist and that is shown in FIG. 3, a specific process of configuring a service key for two network elements is shown in FIG. 6, and includes the following steps.

At S601, a first key management center generates a service key K. In one embodiment, this step may be triggered when the first key management center receives a key request, or may be actively started by the first key management center itself.

Because this embodiment is applicable to the scenario in which two key management centers exist, the two key management centers may generate the service key through negotiation. The following specific manners exist.

Manner 1

At S6011, the first key management center sends a first negotiation parameter to a second key management center, where the first negotiation parameter may be at least one of parameters such as a random number 1, a system time 1, a sequence number 1, and a fresh parameter fresh parameter 1, or may be a first parameter $g^x$ in DH key negotiation.

At S6012, after receiving the first negotiation parameter, the second key management center sends a second negotiation parameter to the first key management center, where the second negotiation parameter may be at least one of parameters such as a random number 2, a system time 2, a sequence number 2, and a fresh parameter fresh parameter 2, or may be a second parameter $g^y$ in the DH key negotiation.

At S6013, the first key management center generates the service key according to a rule K=KDF(first negotiation parameter, second negotiation parameter). If the first negotiation parameter is $g^x$, and the second negotiation parameter is $g^y$, in this case, the first key management center first calculates $g^{xy}$, and then directly uses $g^{xy}$ or KDF($g^{xy}$) as the service key K.

Manner 2 (not shown in FIG. 6): Compared with manner 1, after calculating a result according to a rule K=KDF(first negotiation parameter, second negotiation parameter), the first key management center uses the calculation result as Key and substitutes Key into the rule described in S502 to generate the service key.

In addition to the foregoing manners, the first key management center may generate the service key in the manner of S502. Details are not described herein.

At S602, the first key management center sends the service key to the second key management center.

At S603, the second key management center generates a token.

In this embodiment, for a specific manner of generating the token, refer to S503. It should be noted that, if the token is generated in manner 2 or manner 4 in S503, indication may be sent to the second key management center by the first key management center. For example, in a process of sending the service key to the second key management center by the first key management center, indication is sent to the second key management center at the same time.

At S604, the second key management center sends the token to the first key management center.

At S605, the first key management center sends the service key and the token to a first network element. For a specific manner, refer to S504, and details are not described herein.

At S606, after obtaining the service key and the token, the first network element sends the token to a second network element. For a specific obtaining manner, refer to S505, and details are not described herein.

At S607, the second network element obtains the service key from the token through decryption, and performs integrity verification on the service key.

Figure 7:
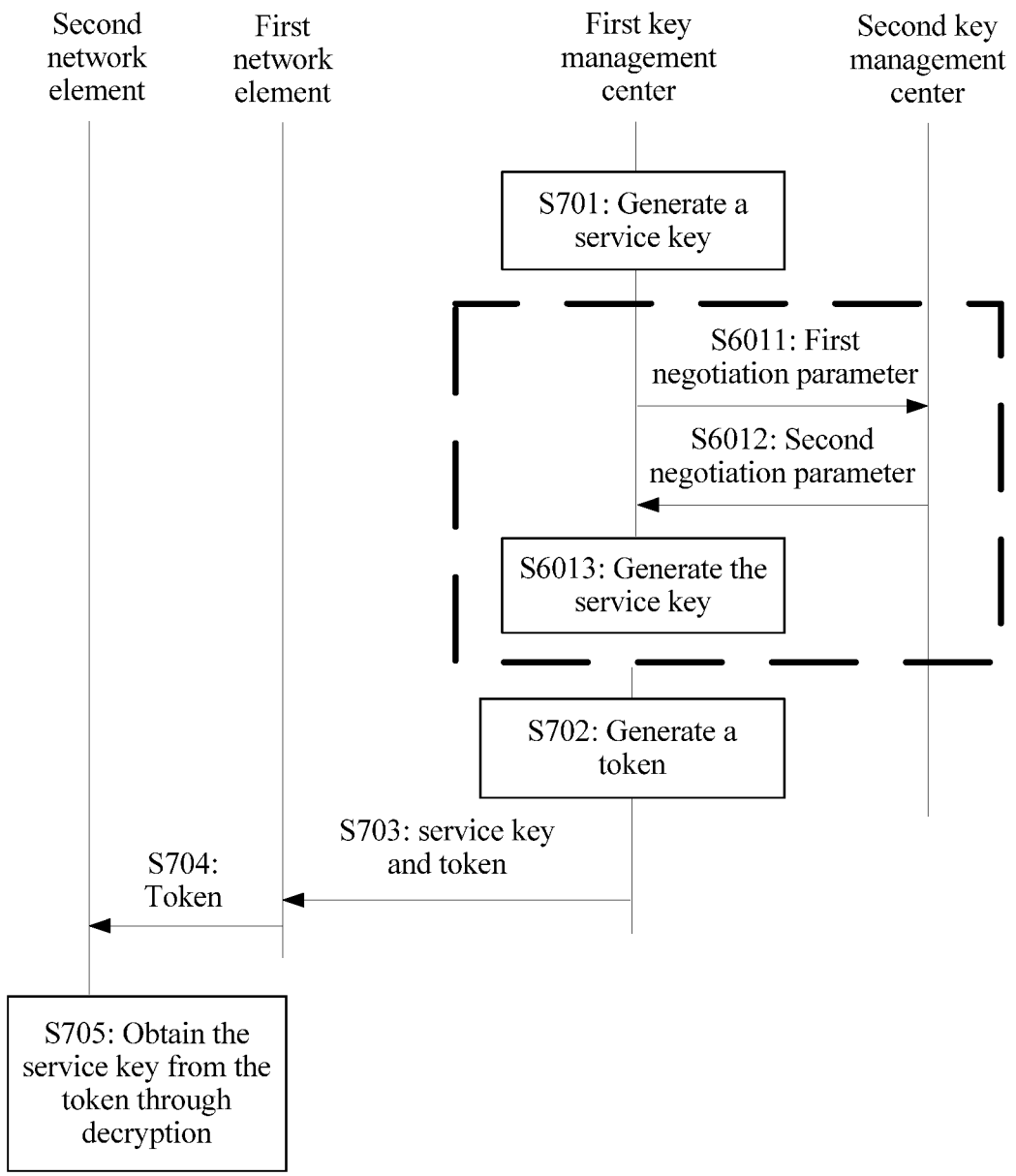
FIG. 7 is a flowchart of another key configuration method according to one embodiment.

In addition to the process shown in FIG. 6, a first key management center may not only generate a service key, but also generate a token. Specifically, as shown in FIG. 7, the following steps are included.

At S701, the first key management center generates the service key. For a specific manner, refer to S601.

At S702, the first key management center generates the token.

It should be emphasized that in this embodiment, as shown in FIG. 3, a second network element and a second key management center are in a same type of network, but the first key management center and the second network element are not in a same type of network. Therefore, it is assumed that the first key management center and a first network element share a key, and the second key management center and the second network element share a key. On this premise, the first key management center can generate the token only according to manner 3 and manner 4 in S503.

At S703, the first key management center sends the service key and the token to a first network element.

At S704, the first network element sends the token to a second network element.

At S705, the second network element obtains the service key by decrypting the token.

Figure 8:
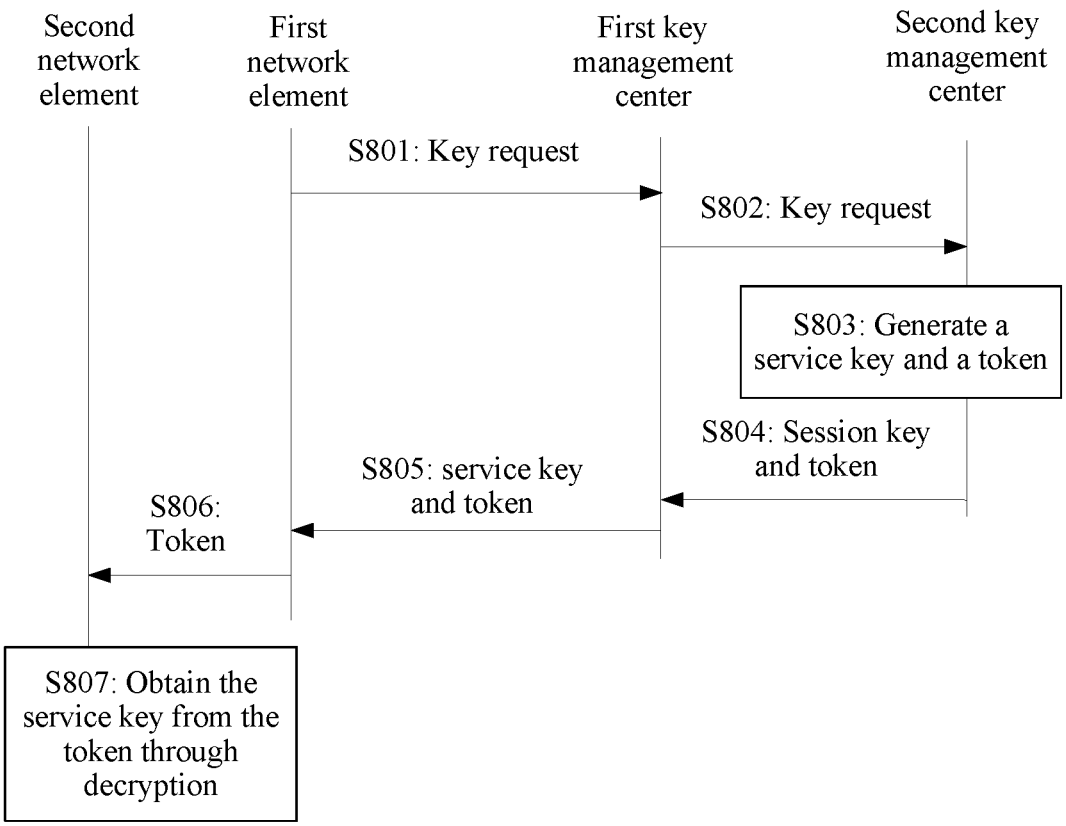
FIG. 8 is a flowchart of another key configuration method according to one embodiment.

In addition to the methods shown in FIG. 6 and FIG. 7, both a service key and a token may be generated by a second key management center. In one embodiment, as shown in FIG. 8, the following steps are included.

At S801, a first key management center receives a key request. The key request carries an identifier of a first network element and an identifier of a second network element, and may further carry indication.

At S802, the first key management center sends the key request to the second key management center.

At S803, the second key management center generates the service key and the token. For a specific generation manner, refer to S503.

At S804, the second key management center sends the service key and the token to the first key management center.

At S805, the first key management center sends the service key and the token to the first network element.

At S806, the first network element sends the token to the second network element.

At S807, the second network element parses out the service key from the token.

In addition to the processes shown in FIG. 6, FIG. 7, and FIG. 8, it is assumed that a first key management center and a first network element share a key, and a second key management center and a second network element share a key. A service key may further be configured for the first network element and the second network element according to a process shown in FIG. 9.

Figure 9:
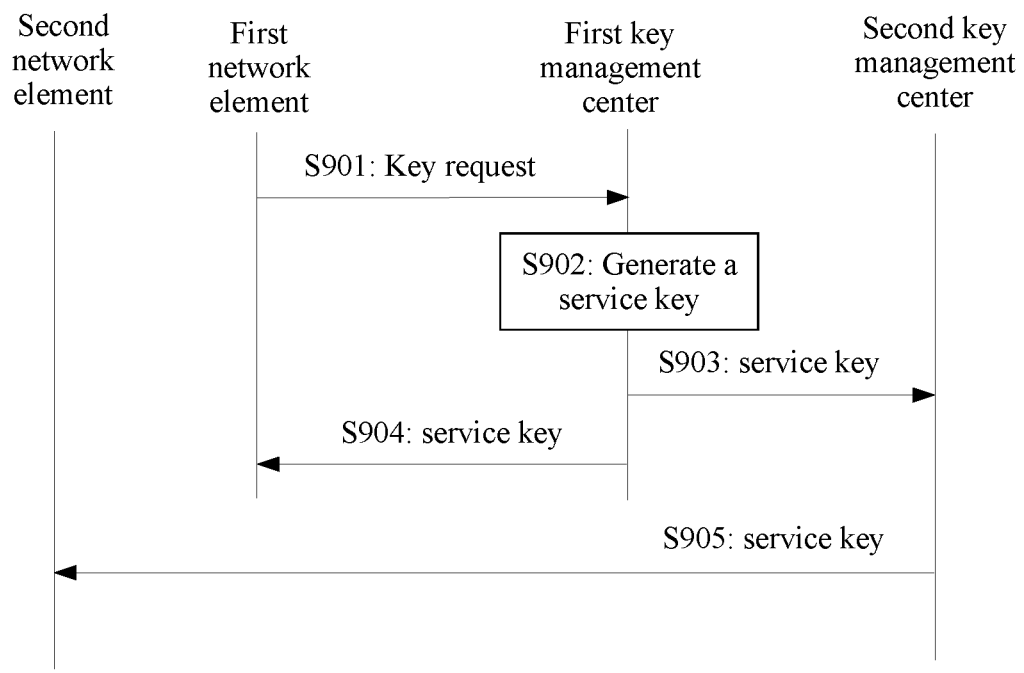
FIG. 9 is a flowchart of another key configuration method according to one embodiment.

As shown in FIG. 9, the following steps are included.

At S901, the first key management center receives a key request sent by the first network element.

At S902, the first key management center generates the service key. For a specific manner, refer to S601.

At S903, the first key management center sends the service key to the second key management center.

At S904, the first key management center sends the service key to the first network element.

In one embodiment, the first key management center may encrypt and send the service key, or may send the service key by using a preset secure channel between the first key management center and the first network element. In one embodiment, an implementation of encrypting and sending the service key includes the following.

Manner 1: The first key management center uses a shared key K1 between the first key management center and the first network element to perform integrity protection on the service key K to obtain a message authentication code MAC_K1_(K); uses K1, a public key PK1 of the first network element, or an identifier ID1 of the first network element to encrypt a character string K∥MAC_K1_(K) including the service key K and the message authentication code MAC_K1_(K) to form a ciphertext, for example, K1 is used, that is, Ciphertext=En_K1_(K∥MAC_K1_(K)); and sends the ciphertext to the first network element.

Manner 2: The first key management center uses a preset private key SK_KMS to calculate a digital signature Signature_SK_KMS_(K) of the service key K; uses K1, PK1, or ID1 to encrypt a character string K∥Signature_SK_KMS_(K) including the service key K and the digital signature Signature_SK_KMS_(K) to form a ciphertext, for example, K1 is used, that is, Ciphertext=En_K1_(K∥Signature_SK_KMS_(K)); and sends the ciphertext to the first network element.

At S905, the second key management center sends the service key to the second network element. A specific sending manner is similar to that in S904. Only K1 in S904 needs to be replaced with the shared key K2 between the second key management center and the second network element, SK needs to be replaced with a preset private key TK of the second key management center, and ID1 needs to be replaced with an identifier ID2 of the second network element.

At S906, the first network element and the second network element separately obtain the service key. Specifically, if a ciphertext is received, the service key needs to be obtained from the ciphertext through decryption.

It should be noted that in one embodiment, S903 and S904 may be transposed, S904 and S905 may be transposed, and/or S904 and S905 may be performed simultaneously.

In other words, in this embodiment, the second key management center may directly send the service key to the second network element without using the token.

Figure 10:
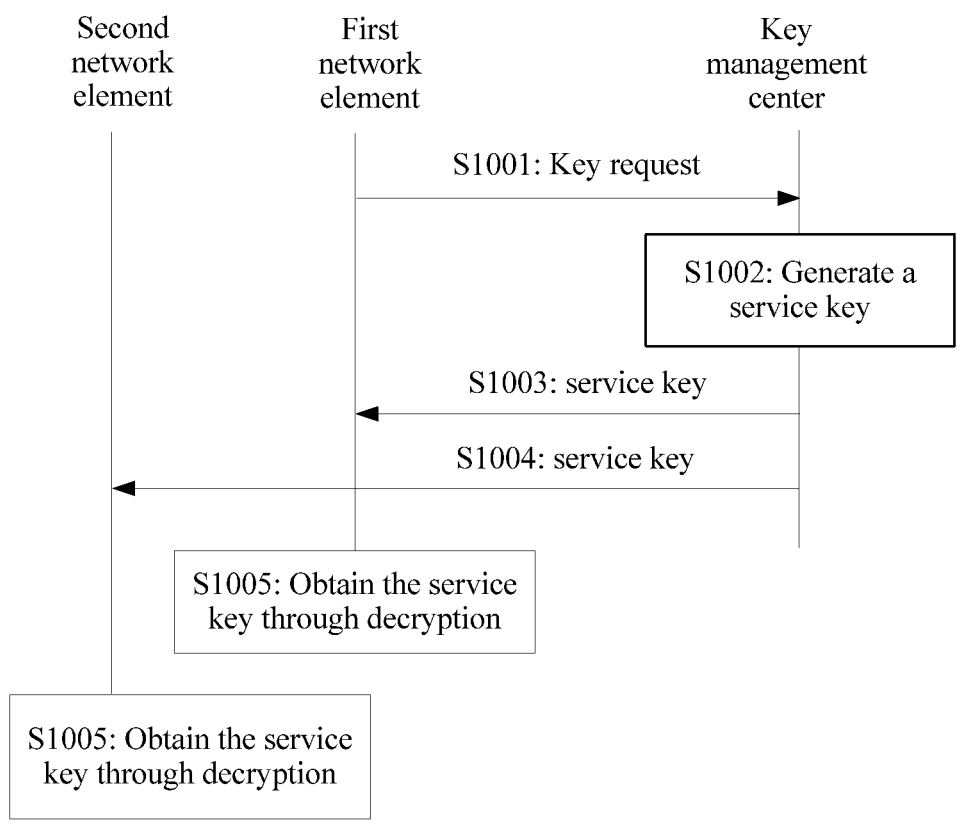
FIG. 10 is a flowchart of another key configuration method according to one embodiment.

The idea shown in FIG. 9 may also be applied to the scenario in which one key management center exists and that is shown in FIG. 2. As shown in FIG. 10, the following steps are included.

At S1001, the key management center receives a key request sent by a first network element.

At S1002, the key management center generates a service key. For a specific implementation, refer to S502.

At S1003, the key management center sends the service key to the first network element. For a specific implementation, refer to S904.

At S1004, the key management center sends the service key to a second network element. A specific implementation is similar to that in S1003. Only K1 needs to be replaced with a shared key K2 between a second key management center and the second network element, SK needs to be replaced with a preset private key TK of the second key management center, and ID1 needs to be replaced with an identifier ID2 of the second network element.

At S1005, the first network element and the second network element separately obtain the service key. Specifically, if a ciphertext is received, the service key needs to be obtained from the ciphertext through decryption.

In addition to a key management center, the first network element shown in FIG. 1, FIG. 2, FIG. 3, FIG. 5, FIG. 6, FIG. 7, or FIG. 8 includes: a second processor and a second memory.

The second memory is configured to store an operating system, an application program, and data generated during running of the application program. The second processor is configured to implement the following functions by running the application program stored in the second memory: obtaining a service key and a token, where the service key is used to perform encryption and/or integrity protection on data transmitted between the first network element and another network element, and the token is a result of performing encryption and/or integrity protection on the service key; and sending the token to the another network element, where the token is used by the another network element to obtain the service key.

For a specific implementation of a function of the network element described in this embodiment, refer to the foregoing embodiments. Details are not described herein.

The network control center shown in FIG. 1, FIG. 2, FIG. 3, FIG. 5, FIG. 6, FIG. 7, or FIG. 8 includes: a third processor and a third memory.

The third memory is configured to store an operating system, an application program, and data generated during running of the application program. The third processor is configured to implement the following functions by running the application program stored in the third memory: receiving a key request, where the key request carries an identifier of a first network element and an identifier of a second network element; if the identifier of the first network element and/or the identifier of the second network element are/is not permanent identifiers/a permanent identifier, replacing the identifier of the first network element with a permanent identifier of the first network element, and/or replacing the identifier of the second network element with a permanent identifier of the second network element; and sending a second key request message to a key management center, where the second key request message includes the permanent identifier of the first network element and the permanent identifier of the second network element; and the key management center is configured to generate a service key and a token based on the permanent identifier of the first network element and the permanent identifier of the second network element that are in the key request, where the token is a result of performing encryption and/or integrity protection on the service key, and the service key is used to perform encryption and/or integrity protection on data transmitted between the first network element and the second network element.

The key management center shown in FIG. 5 includes a fourth processor and a fourth memory.

The fourth memory is configured to store an operating system, an application program, and data generated during running of the application program. The fourth processor is configured to implement the following functions by running the application program stored in the fourth memory: receiving a key request, where the key request carries at least one of an identifier of a first network element, an identifier of a second network element, or a service parameter, and the key request is sent by the first network element, the second network element, a network control center, or a service server; obtaining a service key, where the service key is used to perform encryption and/or integrity protection on data transmitted between the first network element and the second network element; using a shared key between the key management center and the second network element to encrypt a character string including the service key and the first-type key parameter to obtain a token, where the first-type key parameter is a message authentication code that is of the service key and that is calculated by the key management center by using the shared key or a message authentication code that is of a character string including the service key and information about the service key and that is calculated by the key management center by using the shared key, where the information about the service key includes any one of the following items: a usage entity identifier of the service key, a validity period of the service key, a generation time of the service key, and information about a service that uses the service key and service link information; and sending the token, where the token is obtained and forwarded by the first network element to the second network element, so that the second network element obtains the service key based on the token.

The key management center, the network element, and the control center described in the embodiments of this application interact with each other by using the method shown in FIG. 5, FIG. 6, FIG. 7, FIG. 8, FIG. 9, or FIG. 10, and can generate the service key, thereby laying a foundation for end-to-end security communication.

The embodiments in this specification are all described in a progressive manner, for same or similar parts in the embodiments, reference may be made to these embodiments, and each embodiment focuses on a difference from other embodiments.

The embodiments disclosed above are described to enable a person skilled in the art to implement or use this application. Various modifications to the embodiments are obvious to the person skilled in the art, and general principles defined in this specification may be implemented in other embodiments without departing from the scope of this application.

What is claimed is:

1. A key configuration method, comprising:
    receiving, by a key management center, a first key request sent by a network control center, wherein the first key request carries a permanent identifier of a first network element and a permanent identifier of a second network element, the permanent identifier of the first network element is obtained by the network control center by converting a temporary identifier of the first network element, the permanent identifier of the second network element is obtained by the network control center by converting a temporary identifier of the second network element, and the temporary identifier of the first network element and the temporary identifier of the second network element are carried in a second key request that is sent to the network control center by the first network element, the second network element, or a service server;
    obtaining, by the key management center, a service key, wherein the service key is used to perform encryption or integrity protection on data transmitted between the first network element and the second network element;
    obtaining, by the key management center, a token, wherein the token is obtained by performing the encryption or integrity protection on the service key; and
    sending, by the key management center, the token, wherein the token is forwarded by the first network element to the second network element, so that the second network element obtains the service key based on the token.

2. The method according to claim 1, wherein obtaining the token comprises:
    obtaining, by the key management center, a first-type key parameter based on the service key, wherein the first-type key parameter comprises a message authentication code or a digital signature obtained from the service key; and
    using, by the key management center, a first parameter to encrypt a character string comprising the service key and the first-type key parameter to obtain the token, wherein the first parameter comprises a shared key between the key management center and the second network element, a public key of the second network element, or an identifier of the second network element.

3. The method according to claim 2, wherein obtaining the first-type key parameter based on the service key comprises:
    using, by the key management center, the shared key to calculate a message authentication code of the service key.

4. The method according to claim 1, wherein obtaining the service key comprises:
    generating, by the key management center, the service key K according to any one of the following rules:
    K=KDF(Key, (time, at least one of preset parameters)), wherein
    Key is one of or a combination of a plurality of: a random number selected by the key management center, a shared key K1 between the first network element and the key management center, a shared key K2 between the second network element and the key management center, a random number selected by another key management center, or a shared key between the another key management center and the second network element, and time is a deadline, validity period duration, or a current system time of the service key K;
    wherein the preset parameters comprise an identifier of the first network element, an identifier of the second network element, a service parameter, and a sequence number (SN), the service parameter is at least one of a sequence number in a service, a related time of the service key, a related identifier (ID) in the service, a fresh parameter, or a random number, and the SN is used for calculating the service key.

5. A key configuration method, comprising:
    obtaining, by a first network element, a service key and a token sent by a key management center, wherein the service key is used to perform encryption or integrity protection on data transmitted between the first network element and a second network element, and the token is obtained by performing encryption or integrity protection on the service key; and
    sending, by the first network element, the token to the second network element, wherein the token is used by the second network element to obtain the service key;
    wherein the key management center generates the service key and the token when the key management center receives a first key request sent by a network control center, wherein the first key request carries a permanent identifier of the first network element and a permanent identifier of the second network element, the permanent identifier of the first network element is obtained by the network control center by converting a temporary identifier of the first network element, the permanent identifier of the second network element is obtained by the network control center by converting a temporary identifier of the second network element, and the temporary identifier of the first network element and the temporary identifier of the second network element are carried in a second key request that is sent to the network control center by the first network element, the second network element, or a service server.

6. The method according to claim 5, wherein obtaining the service key and the token comprises:
    decrypting, by the first network element, a ciphertext received from a key management center using a shared key between the key management center and the first network element to obtain the service key or obtain the service key and the token.

7. A key configuration method, comprising:
- receiving, by a network control center, a key request, wherein the key request carries an identifier of a first network element and an identifier of a second network element;
- if the identifier of the first network element is not a permanent identifier, replacing, by the network control center, the identifier of the first network element with a permanent identifier of the first network element;
- if the identifier of the second network element is not a permanent identifier, replacing the identifier of the second network element with a permanent identifier of the second network element; and
- sending, by the network control center, a second key request message to a key management center, wherein the second key request message comprises the identifier of the first network element and the identifier of the second network element, the key management center is configured to generate a service key and a token based on the identifier of the first network element and the identifier of the second network element that are in the key request, the token is generated by performing encryption or integrity protection on the service key, and the service key is used to perform encryption or integrity protection on data transmitted between the first network element and the second network element.

8. A key configuration method, comprising:
- receiving, by a key management center, a key request, wherein the key request carries an identifier of a first network element and an identifier of a second network element, and the key request is sent to the key management center by the first network element, the second network element, a network control center, or a service server, wherein if the identifier of the first network element is not a permanent identifier, the network control center replaces the identifier of the first network element with a permanent identifier of the first network element, and if the identifier of the second network element is not a permanent identifier, the network control center replaces the identifier of the second network element with a permanent identifier of the second network element;
- generating, by the key management center, a service key based on at least one of the identifier of the first network element or the identifier of the second network element, wherein the service key is used to perform encryption or integrity protection on data transmitted between the first network element and the second network element;
- using, by the key management center, a shared key between the key management center and the second network element to encrypt a character string comprising the service key and a first-type key parameter to obtain a token, wherein the first-type key parameter is a message authentication code that is of the service key and that is calculated by the key management center by using the shared key or a message authentication code that is of a character string comprising the service key and information about the service key and that is calculated by the key management center by using the shared key, wherein the information about the service key comprises any one of a usage entity identifier of the service key, a validity period of the service key, a generation time of the service key, or information about a service that uses the service key and service link information; and
- sending, by the key management center, the token to the first network element, wherein the first network element is configured to forward the token to the second network element, so that the second network element obtains the service key based on the token.

9. The method according to claim 8, wherein generating the service key comprises:
- generating, by the key management center, the service key K according to any one of the following rules:
- K=KDF(Key, (time, at least one of preset parameters)), wherein
- Key is one of or a combination of a plurality of: a random number selected by the key management center, a shared key K1 between the first network element and the key management center, a shared key K2 between the second network element and the key management center, a random number selected by another key management center, or a shared key between the another key management center and the second network element, and time is a deadline, validity period duration, or a current system time of the service key K; and
- wherein the preset parameters comprise the identifier of the first network element, the identifier of the second network element, a service parameter, and a sequence number (SN), the service parameter is at least one of a sequence number in a service, a related time of the service key, a related identifier (ID) in the service, a fresh parameter, or a random number, and the SN is used for calculating the service key.

10. A key management center, comprising:
- a processor and a memory, wherein
- the memory is configured to store an operating system, an application program, and data generated during running of the application program; and
- the processor is configured to perform the following operations by running the application program stored in the memory:
- receiving a first key request sent by a network control center, wherein the first key request carries a permanent identifier of a first network element and a permanent identifier of a second network element, the permanent identifier of the first network element is obtained by the network control center by converting a temporary identifier of the first network element, the permanent identifier of the second network element is obtained by the network control center by converting a temporary identifier of the second network element, and the temporary identifier of the first network element and the temporary identifier of the second network element are carried in a second key request that is sent to the network control center;
- obtaining a service key, wherein the service key is used to perform encryption or integrity protection on data transmitted between the first network element and the second network element;
- obtaining a token, wherein the token is obtained by performing encryption or integrity protection on the service key; and
- sending the token, wherein the token is forwarded by the first network element to the second network element, so that the second network element obtains the service key based on the token.

11. The key management center according to claim 10, wherein obtaining the token comprises:
- obtaining a first-type key parameter based on the service key, wherein the first-type key parameter comprises a message authentication code or a digital signature obtained from the service key; and using a first parameter to encrypt a character string comprising the service key and the first-type key parameter to obtain the token, wherein the first parameter comprises a shared key between the key management center and the second network element, a public key of the second network element, or an identifier of the second network element.

12. The key management center according to claim 11, wherein obtaining the first-type key parameter based on the service key comprises:

using the shared key to calculate a message authentication code of the service key.

13. The key management center according to claim 10, wherein obtaining the service key comprises:

generating, by the key management center, the service key K according to any one of the following rules:

K=KDF(Key, (time, at least one of preset parameters)), wherein

Key is one of or a combination of a plurality of: a random number selected by the key management center, a shared key K1 between the first network element and the key management center, a shared key K2 between the second network element and the key management center, a random number selected by another key management center, or a shared key between the another key management center and the second network element, and time is a deadline, validity period duration, or a current system time of the service key K;

wherein the preset parameters comprise the identifier of the first network element, the identifier of the second network element, a service parameter, and a sequence number (SN), the service parameter is at least one of a sequence number in a service, a related time of the service key, a related identifier (ID) in the service, a fresh parameter, or a random number; and the SN is used for calculating the service key.

14. A network element, comprising:

a processor and a memory, wherein the memory is configured to store an operating system, an application program, and data generated during running of the application program; and the processor is configured to perform the following operations by running the application program stored in the second memory:

obtaining a service key and a token sent by a key management center, wherein the service key is used to perform encryption or integrity protection on data transmitted between a first network element and another network element, and the token is obtained by performing encryption or integrity protection on the service key; and sending the token to the other network element, wherein the token is used by the other network element to obtain the service key;

wherein the key management center generates the service key and the token when the key management center receives a first key request sent by a network control center, wherein the first key request carries a permanent identifier of the network element and a permanent identifier of the other network element, the permanent identifier of the network element is obtained by the network control center by converting a temporary identifier of the network element, the permanent identifier of the other network element is obtained by the network control center by converting a temporary identifier of the other network element, and the temporary identifier of the network element and the temporary identifier of the other network element are carried in a second key request that is sent to the network control center by the network element, the other network element, or a service server.

15. The network element according to claim 14, wherein obtaining the service key and the token comprises:

decrypting a ciphertext received from a key management center by using a shared key between the key management center and the first network element to obtain the service key or obtain the service key and the token.

16. A network control center, comprising:

a processor and a memory, wherein the memory is configured to store an operating system, an application program, and data generated during running of the application program; and the processor is configured to perform the following operations by running the application program stored in the memory:

receiving a key request, wherein the key request carries an identifier of a first network element and an identifier of a second network element;

if the identifier of the first network element is not a permanent identifier, replacing, by the network control center, the identifier of the first network element with a permanent identifier of the first network element;

if the identifier of the second network element is not a permanent identifier, replacing the identifier of the second network element with a permanent identifier of the second network element; and sending a second key request message to a key management center, wherein the second key request message comprises the identifier of the first network element and the identifier of the second network element; and the key management center is configured to generate a service key and a token based on the permanent identifier of the first network element and the permanent identifier of the second network element that are in the key request, wherein the token is generated by performing encryption or integrity protection on the service key, and the service key is used to perform encryption or integrity protection on data transmitted between the first network element and the second network element.

17. A key management center, comprising:

a processor and a memory, wherein the memory is configured to store an operating system, an application program, and data generated during running of the application program; and the processor is configured to perform the following operations by running the application program stored in the memory:

receiving a key request that carries an identifier of a first network element and an identifier of a second network element, wherein the key request is sent by the first network element, the second network element, a network control center, or a service server, wherein if the identifier of the first network element is not a permanent identifier, the network control center replaces the identifier of the first network element with a permanent identifier of the first network element, and if the identifier of the second network element is not a permanent identifier, the network control center replaces the identifier of the second network element with a permanent identifier of the second network element;

obtaining a service key, wherein the service key is used to perform encryption or integrity protection on data transmitted between the first network element and the second network element;

using a shared key between the key management center and the second network element to encrypt a character string comprising the service key and the first-type key parameter to obtain a token, wherein the first-type key parameter is a message authentication code that is of the service key and that is calculated by the key management center by using the shared key or a message authentication code that is of a character string comprising the service key and information about the service key and that is calculated by the key management center by using the shared key, wherein the information about the service key comprises any one of the following items: a usage entity identifier of the service key, a validity period of the service key, a generation time of the service key, or information about a service that uses the service key and service link information; and sending the token, wherein the token is forwarded by the first network element to the second network element, so that the second network element obtains the service key based on the token.

18. The key management center according to claim 17, wherein obtaining the service key comprises:

generating the service key K according to any one of the following rules:

K=KDF(Key, (time, at least one of preset parameters)), wherein

Key is one of or a combination of a plurality of: a random number selected by the key management center, a shared key K1 between the first network element and the key management center, a shared key K2 between the second network element and the key management center, a random number selected by another key management center, or a shared key between the another key management center and the second network element, and time is a deadline, validity period duration, or a current system time of the service key K; and wherein the preset parameters comprise the identifier of the first network element, the identifier of the second network element, a service parameter, and a sequence number (SN), the service parameter is at least one of a sequence number in the service, a related time of the service key, a related identifier (ID) in the service, a fresh parameter, or a random number, and the SN is used for calculating the service key.

* * * * *